Sept. 29, 1953  E. F. KLESSIG  2,653,624
SEQUENCE VALVE
Filed July 21, 1948

INVENTOR.
ERNST F. KLESSIG
BY
Ralph L. Tweedale
ATTORNEY

Patented Sept. 29, 1953

2,653,624

UNITED STATES PATENT OFFICE 2,653,624

SEQUENCE VALVE

Ernst F. Klessig, Berkley, Mich., assignor to Vickers Incorporated, Detroit, Mich., a corporation of Michigan Application July 21, 1948, Serial No. 39,859

10 Claims. (Cl. 137—540)

This invention relates to power transmissions, and is particularly applicable to those of the type comprising two or more fluid pressure energy translating devices, one of which may function as a pump and another as a fluid motor.

The invention is more particularly concerned with a hydraulic power transmission system of the type wherein it is required to control the sequence of operation of two or more phases of a cycle in the system. Sequence valves, both of the mechanically actuated and pressure fluid operated types are commonly used to provide the timing and controlling necessary in this type of operation by blocking pressure fluid delivery to one fluid operated device until another fluid operated device has been actuated.

One type of sequence valve commonly used to control the timing of operation of two or more fluid actuated devices is the plunger operated check valve type. The check valve prevents flow to the fluid actuated device which is required to be delayed in actuation until another fluid actuated device is operated. Upon completion of actuation of the latter device, the plunger is mechanically actuated to shift the check valve to the open position to permit fluid flow to the former device in order to operate the same.

In sequence valves of the plunger operated check valve type there is a hydraulic force holding the check valve closed plus the force of a check valve spring. Consequently, not only spring resistance must be overcome by the plunger to open the check valve, but in addition the much greater resistance of the hydraulic force holding the check valve closed. The check valve must be made large enough to adequately handle the displacement of the fluid operated device which is controlled. Thus, as the fluid displacement requirements of the system increase, the size of the check valve must be increased and consequently the hydraulic force holding the check valve closed also increases because of the increased effective surface area of the check valve. It can be clearly seen that the pressure force requirements necessary to overcome the increased hydraulic force holding the check valve closed must also be increased.

It is an object of this invention to provide improved sequence valve mechanism which decreases the pressure operating requirements of prior mechanisms of this type.

It is another object of this invention to provide improved sequence valve mechanism comprising a main check valve which may be varied in size according to the displacement requirements of the system and which may be fluid operated to the open position under the control of a smaller check valve requiring a plunger operation force much less than prior sequence valve mechanisms of this type.

In many hydraulic systems it is desired to delay the operation of a reversible fluid actuated motor in only one direction of operation. It is thus imperative that the sequence valve mechanism utilized must be designed to permit free flow of pressure fluid to the motor for actuating the same in the opposite direction without delayed operation.

It is therefore another object of this invention to provide sequence valve mechanism of an improved pilot valve operated type which may be housed in a single casing and which, without the necessity of extra connections and tubing, provides controlled sequential operation in one direction of operation and permits free fluid flow in the opposite direction of operation.

It is still another object of this invention to provide improved sequence valve mechanism which may be of the split type when installation requirements demand it, i. e. the placement near the fluid actuated device of a small check valve requiring a small plunger opening force and a large main check valve placed in a convenient location in the system which may be fluid operated to the open position under the control of the smaller check valve. In some systems the space for installing valve mechanism near fluid operated devices is restricted. Consequently, the improved sequence valve mechanism may be split so that the smaller pilot check valve which requires smaller tubing and only a slight plunger opening force may be placed near the fluid operated device and the larger check valve placed in a more convenient location in the system. It is still another object of the invention to provide an improved sequence valve mechanism which is economical to manufacture, and which is efficient in operation over a long and useful life.

Further objects and advantages of the present invention will be apparent from the following description, reference being had to the accompanying drawing wherein a preferred form of the present invention is clearly shown.

Figure 1:
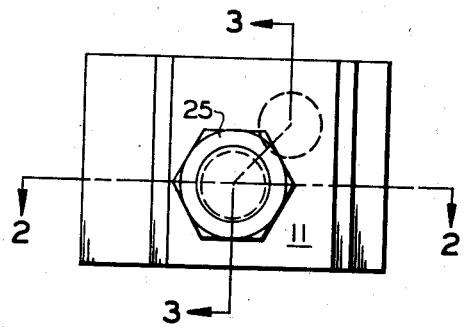
Figure 1 is a top view of a preferred form of the present invention.
Figure 2:
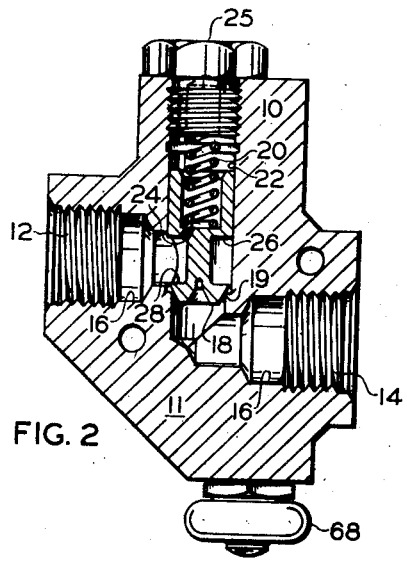
Figure 2 is a sectional view taken on line 2—2 of Figure 1.

Referring now to Figure 2, there is shown a housing 10 of sequence valve mechanism 11 having an inlet port 12 and an outlet port 14 connected by a flow passage indicated generally by the numeral 16. Flow through the passage is controlled by a main check valve 18 of the hollow piston type which is resiliently biased to the closed position upon a seat 19 by a spring 20 mounted in a control chamber 22, the latter of which is in communication with the inlet port 12 by means of a restriction 24 in the valve 18. The control chamber 22 is closed at its upper end by a plug 25.

The check valve 18 is provided with an effective pressure surface area indicated by the numeral 26 tending to unseat the valve which is larger than an opposed effective surface area 28 tending to seat the valve. When the direction of fluid flow is from the inlet to the outlet and the control chamber is vented, the differential effective surface areas in cooperation with the restriction causes pressure fluid operation of the valve to the open position. The valve permits fluid to flow freely in the opposite direction.

The control chamber 22 is connected by a passage 32 to a stepped bore 34 within which auxiliary valve mechanism for venting the control chamber 22 is mounted. The auxiliary mechanism comprises a ball check pilot valve 36 resiliently biased by a spring 38 to the closed position upon a seat 40 formed at one end of a stepped bore 42 of a sleeve 44, the latter of which is mounted in the bore 34. The sleeve bore 42 is connected to the flow passage 16 beyond the valve 18 by cross passages 46. The sleeve 44 is maintained in the stepped bore 34 by a plug 48 having a stepped bore 50 extending completely therethrough registering with the sleeve bore 42. Shiftably mounted within the plug bore 50 is a piston 52 having an upper flange 54 which limits its downward movement. The upward movement of the piston 52 is limited by a stop washer 55 mounted in the bore 34 beneath the sleeve 44. The piston 52 is adapted to be actuated preferably by means mechanically linked in the well known manner to a fluid operated device so that upon actuation of the latter the piston will be shifted upwardly to also shift upwardly a pin 56 shiftably mounted in the bore 42 of the sleeve 44. The pin 56 is adapted to shift the ball valve 36 upwardly to open the seat 40, thus venting the control chamber 22 of the main check valve 18 to the outlet port 16. Fluid displacement from the control chamber 22 enters the stepped bore 34 and unseats another small check valve 58 which is resiliently biased to the closed position by the spring 38 upon a seat 60 formed in the bore 34. The main check valve 18 is adapted to permit flow from the outlet port 16 to the inlet port 12. The ball check valve 58 prevents flow from the outlet port 16 to the control chamber 22 which would prevent the main check valve from opening. Suitable seals, indicated by the numerals 62, 64, and 66, are provided for the sleeve 44.

A rubber boot 68, fastened to the plug 48 and the piston 52 by means of thickened portions of the boot being mounted in grooves provided for that purpose in the plug 48 and the piston 52, prevents dust and dirt from interfering with the operation of the sequence valve mechanism.

It should be noted that the auxiliary ball check valve seating area is much less than the seating area of the main check valve 18. The auxiliary valve mechanism may be made smaller because it only functions to vent the control chamber 22 of the main check valve 18. As the seating area of the auxiliary mechanism is small because it only has to handle a small fluid displacement, the hydraulic force maintaining the ball valve 36 in the closed position is much less than if the same pressure were maintaining the main valve 18 in the closed position because of the greater seating area of the latter. The main check valve 18 must be made large enough to handle the fluid displacement of the fluid operated mechanism which it controls, and hence a much larger effective seating area for the main check valve is necessary.

Figure 4:
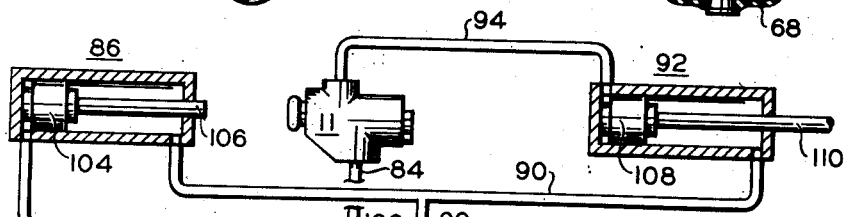
Figure 4 is a diagrammatic view of a hydraulic power transmission system incorporating a preferred form of the present invention.
Figure 4:
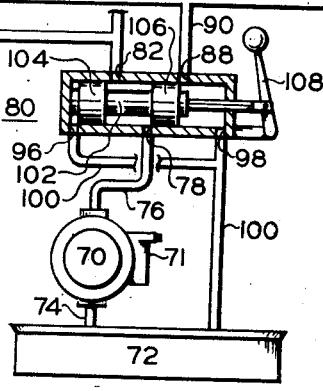

Referring now to Figure 4, there is shown a pump 70, which may be driven by suitable means, not shown, which is connected to a tank 72 by a suction conduit 74, and connected by a delivery conduit 76 to a pressure port 78 of a four-way directional control valve 80. The pump 70 may be provided with a relief valve indicated by the numeral 71 which functions in the well known manner to exhaust excessive pressure fluid to the inlet side of the pump. One of the motor ports 82 of the control valve 80 is connected by a branched conduit 84 to the head end of a motor 86 and to the inlet port 12 of the sequence valve mechanism 11. The remaining motor port 88 of the directional control valve 80 is connected by a branched conduit 90 to the piston rod end of the motor 86 and the piston rod end of a motor 92. The head end of the motor 92 is connected by a conduit 94 to the outlet port 14 of the sequence valve mechanism 11. Tank ports 96 and 98 located at opposite ends of the directional control valve 80 are connected by a branched conduit 100 to the tank 72. The control valve 80 contains a piston 102 having lands 104 and 106 for controlling the direction of fluid flow between the ports.

Both the motor 86 and the motor 92 are of the reciprocating piston type. Motor 86 is provided with a piston 104 connected to which is a piston rod 106 extending from the motor. Motor 92 is provided with a piston 108 to which is connected a piston rod 110 extending from the motor.

For the purposes of illustration only, when the motor 86 has been almost completely actuated to its rightward position, the piston 106 will contact the piston 52 of the auxiliary valve mechanism so as to operate the latter and permit fluid flow through the check valve 18 to the motor 92 to operate the same. In actual practice, as for example an aircraft hydraulic system wherein the landing gear is operated to a retracted position and then followed by the closing of landing gear doors, mechanical leakage associated with the landing gear system would be used to actuate the piston 52.

Figure 3:
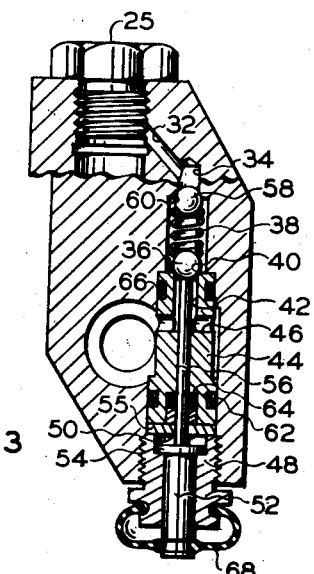
Figure 3 is a sectional view taken on line 3—3 of Figure 1.

Referring now to Figures 2, 3, and 4, with the pump in operation and the control valve 80 in the position shown, the pressure port 78 is connected to the motor port 82 so as to direct pressure fluid from the pump 70 by means of conduit 76, pressure and motor ports 78 and 82 of control valve 80, and branch conduit 84, to the piston end of motor 86 and to the inlet port 12 of the sequence valve mechanism 11. The main check valve 18 will remain closed blocking flow to the motor 92 because it is impossible to shift the valve upwardly when the control chamber 22 is not vented.

The motor 86 will be operated, and when the piston 104 of the motor 86 has almost completed its rightward movement, the piston rod 106 will contact the piston 52 of sequence valve mechanism 11 shifting it upwardly and likewise the pin 56 to open the check valve 36.

The control chamber 22 is then vented to the flow passage 16 beyond the valve 18 by means of passage 32, stepped bore 34 and seat 60 thereof, seat 40, bore 42, and cross passages 46. The ball valve 58 permits flow in the stepped bore 34 from the passage 32 to the seat 40.

A force slightly greater than the spring resistance of spring 38 plus the hydraulic force opposing the opening of the valve equal to the effective area of seat 40 must be overcome to open the valve 36. The movement of the piston 52 is a small one, being limited by the washer 55 on the underside of the sleeve 44.

Pressure fluid entering the flow passage 16 from the inlet port 12 is now in communication with the outlet port 14 by means of restriction 24, control chamber 22, passage 32, bore 34, seats 60 and 40, sleeve bore 42, cross passages 46, and flow passage 16 beyond the valve 18. Due to the fact that pressure fluid may exit from the control chamber 22 faster than it may enter through the restriction 24, a drop in pressure occurs across the restriction 24 and the pressure at the inlet becomes greater than that in the control chamber. Due to the differential effective pressure surface areas of the main check valve 18 in communication with the inlet port 12, the valve 18 is pressure operated upwardly to the open position. Pressure fluid from the pump 70 is then delivered through the flow passage 16, seat 19, outlet port 14, and conduit 94 to the head end of motor 92 to operate the same in a rightward directional movement. Fluid displacement from the rod end of motor 92 is delivered to the tank 72 by means of conduit 90, ports 88 and 96 of control valve 80 and conduit 100.

When the control lever 108 is shifted to the opposite position, the pressure port 78 of the control valve 80 is connected to the motor port 88, and the motor port 82 is connected to the tank port 96. Pressure fluid from the pump 70 is delivered by means of conduits 76, ports 78 and 88, and branch conduit 90, simultaneously, to the rod end of motors 92 and 86 to actuate the same in a leftward direction. Fluid flow from the piston end of motor 92 is free to discharge to the tank 72 by means of conduit 94, port 14 of sequence valve mechanism 11, flow passage 16, check valve 18, seat 19, inlet port 16, conduit 84, motor and tank ports 82 and 96, respectively, of directional control valve 80 and conduit 100. If it were not for check valve 58, fluid discharging from the motor 92 to the outlet port 14 of the sequence valve mechanism 11 would be permitted to flow into the control chamber 22 of the main check valve 18, and because of the restriction in the check valve, build up a pressure which would maintain the valve seated, and thus prevent free flow from the outlet port 14 to the inlet port 12.

The check valve 58 is conveniently located between the control chamber 22 and the seat 40 for the pilot check valve 36, and performs the function of preventing fluid flow from the outlet port 14 to the control chamber 22 of the main valve 18, thus permitting free fluid flow through the valve from the outlet port to the inlet port. No extra space taking tubing or connections are required when the single casing form of the invention is utilized.

Pressure fluid delivered to the rod end of the motor 86 causes a leftward directional movement of the latter. Fluid displacement from the head end of motor 86 is free to flow to the tank 72 by means of conduit 84, motor and tank ports 82 and 96 of control valve 80 and tank conduit 100. When the piston rod 106 has shifted slightly to the left, the auxiliary spring 38 will return pilot check valve 36 to the closed position and the pin 56 and piston 52 will also be returned to the position shown in Figure 3. It should be noted that in addition to requiring less plunger operating force than prior sequence valve mechanism of this type that the distance the plunger pin must travel to open the pilot check valve is slight. This is a decided advantage in aircraft hydraulic systems where mechanical linkage for actuating the plunger pin may be restricted because of space requirements.

When installation requirements demand it, the smaller check valve mechanism may be mounted in a separate casing and connected to the control chamber 22 of the main valve by separate tubing.

The separate casing may be provided with an inlet port connected to passage 32 and an outlet port connected to the sleeve cross passages 46, the former of which would also be connected to the control chamber 22 of the main valve while the latter would be connected to any convenient venting location in the system.

It can be clearly seen that smaller tubing would be required than for operation of the single plunger operated check valve type of sequence valve because the smaller check valve mechanism would not be utilized for handling the full fluid displacement of the fluid operated device, but only for venting the main check valve placed in another part of the system.

While the form of embodiment of the invention as herein disclosed constitutes a preferred form, it is to be understood that other forms might be adopted, all coming within the scope of the claims which follow.

What is claimed is as follows:

1. Sequence valve mechanism for use in a hydraulic power transmission system comprising in combination a body having a flow passage extending therethrough, a main check valve interposed in the passage permitting free fluid flow in one direction and normally preventing fluid flow in the opposite direction, operating means connected to the valve exposed to fluid flow in the said opposite direction and including a ventable control chamber for shifting the check valve to the open position when fluid flow is in the opposite direction and the control chamber is vented, an auxiliary check valve normally preventing flow from the control chamber, and means for selectively operating the auxiliary check valve to the open position to vent the control chamber.

2. Sequence valve mechanism for use in a hydraulic power transmission system comprising in combination a body having a first and a second external connection port connected by a main flow passage, a main check valve interposed in the passage preventing flow through the passage from the first port to the second port and permitting free fluid flow through the passage in the opposite direction, operating means connected to the check valve exposed to fluid flow directed through the passage from the first port and including a ventable control chamber for shifting the check valve to the open position when the direction of flow is from the first port to the second port and the control chamber is vented, an auxiliary passage connecting the control chamber to the main flow passage between the check valve and the second port, an auxiliary check valve in the auxiliary passage normally closing the control chamber from the main flow passage; and means for selectively operating the auxiliary check valve to the open position to vent the control chamber to the second port of the flow passage.

3. Sequence valve mechanism for use in a hydraulic power transmission system comprising in combination a body having a flow passage extending therethrough, a main check valve interposed in the passage having opposed surface areas exposed to flow in opposite directions through the passage, one of which serves as operating means to shift the valve to open position permitting free fluid flow through the passage in one direction and the other of which serves to maintain the valve in closed position to prevent flow through the passage in the other direction, a piston fastened to the check valve having a surface area exposed to fluid flow in the other direction and including a ventable control chamber for operating the check valve to the open position when fluid flow in the passage is in the said other direction and the control chamber is vented, an auxiliary check valve normally preventing flow from the control chamber, and means for selectively operating the auxiliary check valve to the open position to vent the control chamber.

4. Sequence valve mechanism for use in a hydraulic power transmission system comprising in combination a body having a flow passage extending therethrough, a main check valve interposed in the passage permitting free fluid flow in one direction and normally preventing fluid flow in the opposite direction, operating means connected to the valve exposed to fluid flow in the said opposite direction and including a ventable control chamber for shifting the check valve to the open position when fluid flow is in the opposite direction and the control chamber is vented, a venting passage leading from the control chamber, a pair of auxiliary check valves oppositely arranged in the passage, one of which prevents fluid flow through the passage to the control chamber, and the other of which normally prevents fluid flow from the control chamber through the passage, and means for selectively operating the other check valve to the open position to vent the control chamber.

5. Sequence valve mechanism for use in a hydraulic power transmission system comprising in combination a flow passage, a main check valve interposed in the passage having operating surfaces exposed to flow in the passage in opposite directions for opening and closing the valve to permit free fluid flow in one direction and normally preventing fluid flow in the opposite direction, a piston connected to the check valve having a ventable control chamber connected to the flow passage, said piston having opposed operating surfaces exposed to the pressures in the control chamber and the flow passage, the effective areas of said surfaces relative to the effective area of the check valve operating surface being sufficient to cause the piston to operate the check valve to the open position when the flow is in a direction tending to close the check valve and the control chamber is vented for unbalancing the pressures acting on the piston operating surfaces, a venting passage leading from the control chamber, an auxiliary check valve normally closing the venting passage, and means for selectively operating the auxiliary check valve to the open position to vent the control chamber through the venting passage.

6. Sequence valve mechanism for use in a hydraulic power transmission system comprising in combination a body having a flow passage extending therethrough, a main check valve interposed in the passage having operating surfaces exposed to flow in the passage in opposite directions for opening and closing the valve to permit free fluid flow in one direction and normally preventing fluid flow in the opposite direction, a piston connected to the check valve having a ventable control chamber connected to the flow passage, said piston having opposed operating surfaces exposed to the pressures in the control chamber and the flow passage, the effective areas of said surfaces relative to the effective area of the check valve operating surface being sufficient to cause the piston to operate the check valve to the open position when the flow is in a direction tending to close the check valve and the control chamber is vented for unbalancing the pressures acting on the piston operating surfaces, a venting passage leading from the control chamber, a pair of check valves oppositely arranged in the venting passage, and means for selectively operating to the open position the check valve in said passage which normally prevents flow from said passage.

7. Sequence valve mechanism for use in a hydraulic power transmission system comprising in combination a body having a flow passage extending therethrough, a main check valve interposed in the passage having opposed operating surfaces exposed to flow in opposite directions through the passage, one of which serves to shift the valve to open position permitting free fluid flow through the passage in one direction and the other of which serves to maintain the valve in closed position to prevent flow through the passage in the other direction, a piston connected to the check valve and having a ventable control chamber hydraulically connected to the flow passage, said piston having opposed operating surfaces one of which is exposed to pressure in the control chamber and the other being exposed to pressure in the flow passage, the other operating surface of the piston opposing the operating surface of the check valve which tends to close said valve and having an effective area greater than said check valve operating surface for causing the piston to operate the check valve to the open position when flow through the passage is in the other direction and the control chamber is vented, an auxiliary check valve normally preventing flow from the control chamber, and means for selectively operating the auxiliary check valve to the open position to vent the control chamber.

8. Sequence valve mechanism for use in a hydraulic power transmission system comprising in combination a body having a flow passage extending therethrough, a main check valve interposed in the passage having opposed operating surfaces exposed to flow in opposite directions through the passage, one of which serves to shift the valve to open position permitting free fluid flow through the passage in one direction and the other of which serves to maintain the valve in closed position to prevent flow through the passage in the other direction, a piston connected to the check valve and having a ventable control chamber hydraulically connected to the flow passage, said piston having opposed operating surfaces one of which is exposed to pressure in the control chamber and the other being exposed to pressure in the flow passage, the other operating surface of the piston opposing the operating surfaces of the check valve which tends to close said valve and having an effective area greater than said check valve operating surface for causing the piston to operate the check valve to the open position when flow through the passage is in the said other direction and the control chamber is vented, a venting passage leading from the control chamber, a pair of auxiliary check valves oppositely arranged in the passage to normally block flow to and from the control chamber through the venting passage, and means for selectively operating to the open position the auxiliary check valve which blocks flow from the control chamber and thereby venting said control chamber.

9. Sequence valve mechanism for use in a hydraulic power transmission system comprising in combination a flow passage, a main valve for controlling flow through said passage and including a ventable control chamber connected to the flow passage, said main valve having a plurality of operating surfaces one of which is exposed to flow in one direction of operation for operating the valve to the open position and permit free fluid flow through the passage in said direction, two of said operating surfaces being opposed to each other and exposed to flow in the opposite direction, one of said two surfaces tending to operate the valve to the closed position and the other tending to operate the valve to the open position and the surface tending to operate the valve to the open position having a larger effective area than the other surface, and another operating surface exposed to pressure in the control chamber and tending to maintain the valve closed, the differential in effective areas of the operating surfaces normally maintaining the valve closed when flow is in the said opposite direction and causing said valve to be operated to the open position when the control chamber is vented to unbalance the pressures acting on the operating surfaces, an auxiliary check valve for controlling the venting of the control chamber and means for selectively operating the auxiliary check valve to the open position to vent the control chamber.

10. Sequence valve mechanism for use in a hydraulic power transmission system comprising in combination a main valve interposed in said passage and including a ventable control chamber connected to the flow passage, said main valve having a plurality of operating surfaces one of which is exposed to flow in one direction of operation for operating the valve to open position and permit free fluid flow through the passage in said direction, two of said operating surfaces being opposed to each other and exposed to flow in the opposite direction, one of said two surfaces tending to operate the valve to the closed position and the other tending to operate the valve to the open position and the surface tending to operate the valve to the open position having a larger effective area than the other surface, and another operating surface being exposed to pressure in the control chamber and tending to maintain the valve closed, the differential in effective areas of the operating surfaces normally maintaining the valve closed when flow is in the said opposite direction and causing said valve to be operated to the open position when the control chamber is vented to unbalance the pressure acting on the operating surfaces, a venting passage leading from the control chamber, a pair of check valves oppositely arranged in the passage, and means for selectively operating to the open position the check valve which normally prevents flow from said venting passage.

ERNST F. KLESSIG.

References Cited in the file of this patent

UNITED STATES PATENTS

| Number | Name | Date |
|--------|------|------|
| 1,056,562 | Lombard | Mar. 18, 1913 |
| 1,209,753 | Phillips | Dec. 26, 1916 |
| 1,912,029 | Block | May 30, 1933 |
| 2,249,206 | Hubbard | July 15, 1941 |
| 2,268,227 | Rose | Dec. 30, 1941 |

FOREIGN PATENTS

| Number | Country | Date |
|--------|---------|------|
| 23,822 | Great Britain | Apr. 1, 1898 |